US011307320B2

(12) United States Patent
Behura

(10) Patent No.: US 11,307,320 B2
(45) Date of Patent: Apr. 19, 2022

(54) EXPEDIENT PROCESSING AND WAVEFORM INVERSION OF SEISMIC DATA

(71) Applicant: Jyoti Behura, Littleton, CO (US)

(72) Inventor: Jyoti Behura, Littleton, CO (US)

(73) Assignee: JYOTI BEHURA, Saint Louis, MO (US)

( * ) Notice: Subject to any disclaimer, the term of this patent is extended or adjusted under 35 U.S.C. 154(b) by 520 days.

(21) Appl. No.: 14/995,748

(22) Filed: Jan. 14, 2016

(65) Prior Publication Data

US 2016/0209534 A1 Jul. 21, 2016

Related U.S. Application Data

(60) Provisional application No. 62/205,842, filed on Aug. 17, 2015, provisional application No. 62/104,063, filed on Jan. 15, 2015.

(51) Int. Cl.
*G01V 1/36* (2006.01)
*G01V 1/30* (2006.01)

(52) U.S. Cl.
CPC .............. *G01V 1/366* (2013.01); *G01V 1/305* (2013.01)

(58) Field of Classification Search
CPC ................. G01V 1/284; G01V 1/366
See application file for complete search history.

(56) References Cited

U.S. PATENT DOCUMENTS

| 4,809,239 | A | * | 2/1989 | Esmersoy | G01V 1/303 367/33 |
|---|---|---|---|---|---|
| 6,041,018 | A | * | 3/2000 | Roche | G01V 1/366 340/853.1 |
| 2015/0331128 | A1 | * | 11/2015 | Mikada | G01V 1/006 367/16 |

(Continued)

OTHER PUBLICATIONS

Stuart Crampin, Seismic-wave propagation through a cracked solid: polarization as a possible dilatancy diagnostic, Geophysical Journal International, vol. 53, Issue 3, Jun. 1978, pp. 467-496.

(Continued)

*Primary Examiner* — Charlie Y Peng

(57) ABSTRACT

A method for expediently processing and inverting elastic wave data to reduce the amount of data and to determine a physical properties model of the material medium and a source properties model. The data are processed to generate waveforms containing the phase difference between compressional- and shear-wave arrivals using auto-correlation, cross-correlation, or deconvolution of said data sensed at each of an arrangement of sensors, whereby said lengthy elastic wave data records are reduced substantially in time. Said waveform data are thereafter inverted using waveform inversion by modifying the source term in the equation of motion, wherein the source term is mathematically expressed as a product of time-independent source properties volume defined at every location in space within said material medium and a space-independent source-time function, whereby no prior knowledge of the number of sources, spatial distribution of source location, source amplitude, or source focal mechanism is needed.

12 Claims, 13 Drawing Sheets

(56) References Cited

U.S. PATENT DOCUMENTS

2021/0103065 A1* 4/2021 Whitmore, Jr. ........ G01V 1/301

OTHER PUBLICATIONS

Stuart Crampin, Evaluation of anisotropy by shear-wave splitting, Geophysics (1985) 50 (1): 142-152.

R. M. Alford, Shear Data in the Presence of Azimuthal Anisotropy: Dilley, Texas, Seg Technical Program Expanded Abstracts, 1986, pp. 476-479.

Marshall Martin and Thomas Davis, Shear-wave birefringence: A new tool for evaluating fractured reservoirs, The Leading Edge, 1987, vol. 6, Issue 10, pp. 22-28.

W. C. Chew, Elastic Wave Lecture Notes, ECE471, University of Illinois at Urbana-Champaign, 1991.

Michael P. Lamoureux, The mathematics of PDEs and the wave equation, Seismic Imaging Summer School, Aug. 7-11, 2006, Calgary.

Richard Fitzpatrick, Solution of Inhomogeneous Wave Equation, 2014, https://farside.ph.utexas.edu/teaching/jk1/Electromagnetism/node7.html.

Unknown, Acoustics in the Time Domain, Wolfram Language & System, Date: unknown, https://reference.wolfram.com/language/PDEModels/tutorial/Acoustics/AcousticsTimeDomain.html.

Kurt J. Marfurt, Accuracy of finite-difference and finite-element of the scalar and elastic wave equations, Geophysics, vol. 49, No. 5 (May 1984); p. 533-554.

R. Gerhard Pratt, Seismic waveform inversion in the frequency domain, Part 1: Theory and verification in a physical scale model, Geophysics, vol. 64, No. 3 (May-Jun. 1999); p. 888-901.

Laurent Sirgue, Inversion de la forme d'onde dans le domaine frequential de donnees sismiques grands offsets. Ph.D. thesis, 2003, University Paris XI.

C. Ravaut, S. Operto, L. Improta, J. Virieux, A. Herrero and P. Dell'Aversana, Multiscale imaging of complex structures from multifold wide-aperture seismic data by frequency-domain full-waveform tomography: application to a thrust belt, Geophys. J. Int. (2004) 159, 1032-1056.

Jonathan B. Ajo-Franklin, Frequency-Domain Modeling Techniques for the Scalar Wave Equation : An Introduction, 2011, https://www.researchgate.net/publication/265813106_Frequency-Domain_Modeling_Techniques_for_the_Scalar_Wave_Equation_An_Introduction.

Unknown, Acoustics in the Frequency Domain, Wolfram Language & System, Date: unknown, https://reference.wolfram.com/language/PDEModels/tutorial/Acoustics/AcousticsFrequencyDomain.html.

* cited by examiner

EXPEDIENT PROCESSING AND WAVEFORM INVERSION OF SEISMIC DATA

CROSS-REFERENCE TO RELATED APPLICATIONS

This application claims the benefit of U.S. Provisional Application No. 62/104,063, filed 15 Jan. 2015, and U.S. Provisional Application No. 62/205,842, filed 17 Aug. 2015, by the present inventor, which are incorporated by reference.

FEDERALLY SPONSORED RESEARCH OR DEVELOPMENT

Not applicable

SEQUENCE LISTING OR PROGRAM

Not applicable

COPYRIGHT NOTICE

Some portions of the disclosure of this patent document may contain material subject to copyright protection. The copyright owner has no objection to the facsimile reproduction by anyone of the patent document or ensuing disclosure as it appears on record at the Patent and Trademark Office, but otherwise reserves all copyright rights whatsoever.

BACKGROUND OF THE INVENTION

The present invention relates to a method for expediently processing elastic wave data through reduction of said data and use it for subsurface mapping with waveform inversion. More particularly, the present invention relates to a method for expedient processing of seismic data for subsurface mapping with waveform inversion that reduces the amount of data by auto-correlating, cross-correlating, or deconvolving said data to generate waveforms comprising the phase difference between each compressional-wave incident and shear-wave incident sensed at each of an arrangement of sensors, to generate a relevant data set from continuous data, wherein waveform inversion is expediently applicable to said relevant data set, whereby substrate physical properties distribution and source properties distribution are frequently determinable expeditiously and a subsurface map thereby expediently generable, and effects of activity within and around said substrate are consistently monitorable. The present invention also relates to a method for making waveform inversion for source properties tractable and practical, wherein the source term of the equation of motion is mathematically expressed as the product of a time-independent source properties term and a space-independent source-time function, and wherein said time-independent source properties term is defined everywhere in space within said substrate.

The permeability of reservoir rocks can be enhanced through hydraulic fracturing, wherein high-pressure fluids and proppants are pumped into rock formations to create fractures. These fractures create pathways for the oil and gas to flow from the stimulated portions of the rock to the wellbore and then to the surface. The above process breaks up the rock at many locations in the formation. The disintegration or fracturing of the rocks are associated with a significant drop in the compressional-wave and shear-wave moduli. At other locations, no fractures are created; instead the pore pressure increases because of the fluids pumped at high pressure. These zones will experience a drop in compressional- and shear-wave velocities as can be seen from the work of [1]. Yet at other locations, where the formation has neither been fractured nor has experienced a pore-pressure increase because of the lack of hydraulic communication with the well bore, the rocks might be subjected to an increase in confining stress. The rock formations above and below the hydraulic fracture zone are a prime candidate for confining stress effects only. The compressional- and shear-wave velocities will increase in these zones ([1]).

The first two zones, fractured rocks and pore-pressure-affected rocks, will result in hydrocarbon production because of hydraulic communication with the well bore. The third zone with confining-stress effects only, however, will not contribute to any production because of the lack of hydraulic communication with the well. Knowing the P- and S-wave velocity distribution can provide valuable information necessary for computing stimulated reservoir volume, planning re-fracturing operations, and in overall resource exploitation.

Various types of methods for processing passive seismic data are known in the prior art to image hydraulic fracturing events. Most require teasing through continuously generated waveform data over a particular time period to determine incidents of compressional-wave and shear-wave propagation measurable at at least one sensor disposed sensible of seismic activity sounded within an underlying substrate. Currently, microseismic data interpretation is done using imaged hypocenter locations [2, 3, 4, 5, 6, 7]. The time of incident sensing of each compressional-wave or each shear-wave provides an understanding of an estimated hypocenter location within a substrate with an assumed velocity distribution. These spatial distribution of the hypocenters is used as a proxy for the extent and alignment of fractures. There are two major drawbacks of this approach. First, the imaged hypocenters yield an incomplete picture of the effects of hydraulic fracturing. Not all rock property changes from fracturing result in seismic activity and many of the changes that do result in seismic activity might be below the noise threshold. Second, the imaged hypocenters are most likely inaccurate. This is because the imaging is done using a velocity model extracted from traveltime tomography of perforation shots or using well log velocities. These velocities will be quite different from the velocities resulting from hydraulic fracturing and therefore inappropriate for imaging. Moreover, traveltime tomography of microseismic events needs arrival time picking, through manual or automatic means, which might incorporate errors into imaging.

Waveform inversion can overcome many drawbacks of traveltime tomography and provide high-resolution velocity maps of the subsurface [8]. Waveform inversion minimizes the misfit between the recorded and computed waveforms by iteratively updating the model parameters which typically are the subsurface properties such as velocity and occasionally source parameters. After being initially proposed by [9] and [10], waveform inversion has recently gained popularity in global earth seismology and the hydrocarbon exploration setting.

Waveform inversion can be applied to microseismic data (as done in [11]) using the formalism developed for global earth seismology [12, 13, 14, 15]. Microseismic data, however, can span over several minutes, hours, days, and weeks which makes waveform inversion of said data computationally intensive and prohibitively expensive. Moreover, in addition to velocity, the model parameters include source properties such as location, source strength, source focal mechanism, and source signature which further complicate the inversion.

In earthquake seismology, the hypocenter location is often determined using the traveltime difference between the compressional- and shear-wave arrivals through the following equation:

$$t_S - t_P = D\left(\frac{1}{V_S} - \frac{1}{V_P}\right) = D(S_S - S_P), \tag{1}$$

where $t_S$ and $t_P$ are the picked shear- and compressional-wave traveltimes at a station, D is the distance between the station and the hypocenter, $V_S$ and $V_P$ are the shear- and compressional-wave velocities and $S_S$ and $S_P$ are the corresponding slownesses. With a minimum of three unique stations and an estimate of the $1/V_S - 1/V_P$, one can use triangulation to locate the earthquake hypocenter.

However, reams of data are typically analyzed across waveform data to generate an approximate hypocenter location, derived from assumed velocity distributions. Moreover, picking shear- and compressional-wave events on lengthy data records spanning hours, days, and weeks is manually intensive and may incorporate errors into the picked travel-times. Therefore, this method remains impractical for continuous up-to-date monitoring of activity within a substrate, as is desirable when hydraulic fracturing, for example, is conducted within said substrate.

What is needed is a method for reducing lengthy data records spanning minutes, hours, days, and weeks to waveforms spanning only a few seconds and a method for waveform inversion of said reduced waveforms. Such methods will enable expedient processing seismic data for subsurface mapping with waveform inversion. This invention includes auto-correlating, cross-correlating, or deconvolving said lengthy data records to generate waveforms comprising the phase difference between compressional-wave and shear-wave incidents, to generate a relevant data set far less numerous than precedent data, wherein waveform inversion is expeditiously applicable to said relevant waveform data whereby a physical properties distribution and source properties distribution of a sensed substrate is determinative for generation of a subsurface map, and activity within said substrate is monitorable and said subsurface map updatable, as desired. This invention also includes modifying the source term of the equation of motion to make waveform inversion for source properties tractable and practical.

SUMMARY

The present method for expediently processing seismic data for subsurface mapping with waveform inversion has been devised to provide rapid generation and processing of waveform data generated in the field at an arrangement of surface and subsurface sensors. Current seismological techniques are time intensive, as passive data are often processed by hand or in total. The problem is compounded across large sensor arrays, where data are continuously monitored at multiple locations.

Such time intensity prohibits efficient use of seismic data to monitor changes in a substrate undergoing human activity, such as, for example, when hydraulic fracturing is occurring in said substrate. The present method for expediently processing seismic data for subsurface mapping with waveform inversion, therefore, has been devised to enable repeated, expeditious processing of seismic data as relevant data sets, whereby the recorded data (which is typically continuously acquired for extended time periods across multiple locations) is substantially reduced.

The present method thus reduces sensed data from minutes, hours, day, and week increments down to seconds whereby rapid waveform inversion is applicable to said relevant data sets to determine changes in velocity distribution sensed within a substrate and generate source properties distribution within said substrate, whereby subsurface mapping is enabled. The resulting inverted velocity distribution, V, is related to the compressional-wave and shear-wave velocity distributions as follows:

$$V = \frac{1}{C_S - C_P} = \frac{V_P V_S}{V_P - V_S}, \tag{2}$$

where $C_S$ is the shear-wave slowness, $C_P$ is the compressional-wave slowness, $V_S$ is the shear-wave velocity, and $V_P$ is the compressional-wave velocity.

Effects of human activity within a substrate are thereby expediently chartable across time and space. Changes to said substrate are thus mappable, and extent of fracturing therein ascertainable, whereby impact and course of an activity is measurable.

Waveform inversion as set forth in the present invention is setup to recover the velocity combination $V_P V_S/(V_P - V_S)$ and the source amplitude distribution from said relevant data sets. The gradient of the least-squares objective function is efficiently computed using the adjoint-state method described in [12, 16, 17, 13]. Here, however, I use a modified source term in the acoustic wave equation $$\frac{1}{V(x)^2} \frac{\partial^2 u(x,t)}{\partial t^2} - \nabla^2 u(x,t) = A(x) S(t), \tag{3}$$

where $$V(x) = \frac{V_P(x) V_S(x)}{V_P(x) - V_S(x)},$$

$S(t) = \mathcal{F}^{-1}(|s(\omega)|^2)$ for cross-correlation, and, $S(t) = \mathcal{F}^{-1}(|s(\omega)|/|s(\omega)|)$ for deconvolution, x is the spatial coordinate, t is time, u is the wavefield, A(x) represents the spatial distribution of the amplitude of the source-time function S(t), s(ω) is the frequency-domain source signature, and $\mathcal{F}$ represents the inverse Fourier Transform operator.

The source expression in equation 3 is different from the one used in waveform inversion of seismic data in prior art [13, 14, 18]. In the prior art, inversion for source location and source initiation time is performed, which necessitates that the practitioner know the number of seismic events present in the data prior to inversion. Also, in the prior art, the practitioner must also have a fairly good prior knowledge of the source properties he or she is interested in inverting for using waveform inversion.

To overcome this issue, in the present invention, a modified source term as shown in equation 3 is implemented. Equation 3 states that there is a seismic source at every spatial location of said substrate; the amplitude of these sources, however, may vary spatially within said substrate. It is up to the inversion process to determine the amplitude of the each of the seismic sources at every spatial location of said substrate. Wherever there is a seismic source in the substrate, waveform inversion should yield a non-zero amplitude which corresponds to the source amplitude at that location, and where there are no seismic sources, the inversion should yield a zero amplitude.

The waveform inversion formalism, as described in the present invention, yields the following expressions for gradients of the misfit function $g_V$ and $g_A$ $$g_V(x) = \frac{2}{V^3} \int_0^T u^\dagger(x, T-t) \frac{\partial^2 u(x,t)}{\partial t^2} dt \text{ and} \tag{4}$$

$$g_A(x) = \int_0^T u^\dagger(x, T-t) S(t) dt, \tag{5}$$

with respect to the model parameters $V=V_P V_S/(V_P-V_S)$ and A, respectively. The quantity $u^\dagger$ is the adjoint wavefield generated by back-propagating the data residuals. $g_V(x)$ is proportional to the cross-correlation between the adjoint wavefield and the forward wavefield. The gradient $g_A(x)$ is given by the cross-correlation between the adjoint wavefield and the space-independent source-time function. It is interesting to note that $g_A(x)$ is in fact the imaging condition used in Reverse Time Migration of passive data if the source-time function were a delta function. Equation 5 for $g_A(x)$ suggests that a more appropriate imaging condition for Reverse Time Migration of passive data should be the cross-correlation of the back-propagated passive data with the source signature.

The present method for expediently processing seismic data for subsurface mapping with waveform inversion, therefore, includes setting an arrangement of surface and subsurface sensors in position appropriate for measuring seismological activity within a substrate. Each sensor may be single component or multicomponent sensor. Waveform data are generated by continuous monitoring of said arrangement of surface and subsurface sensors. Waveform data are delivered to a computing device running at least one processor wherein said waveform data are either auto-correlated, cross-correlated, or deconvolved. Alternatively, said data are decomposed into shear- and compressional-waveforms which are thereafter cross-correlated or deconvolved. A waveform is thereby generated comprising a phase difference between each sensed compressional-wave and shear-wave incident at each of the arrangement of sensors, whereby a relevant data set is generable, a data set specific to wave propagation through the substrate.

The above-described operation may be represented by the following equations $$d_{SP}(\omega) = d_S(\omega) d_P^*(\omega) = |s(\omega)|^2 G_S(\omega) G_P^*(\omega) = S(\omega) G_S(\omega) G_P^*(\omega), \tag{6}$$

and $$d_{SP}(\omega) = \frac{d_S(\omega)}{d_P(\omega)} = \frac{s(\omega) G_S(\omega)}{s(\omega) G_P(\omega)} = S(\omega) \frac{G_S(\omega)}{G_P(\omega)}, \tag{7}$$

where $\omega$ is the frequency, $d_{sp}$ is the computed waveform, $d_s$ and $d_p$ are the raw data corresponding to two different elastic wave modes, $G_s$ and $G_p$ are the Green's functions for the two different elastic wave modes, s is the original source-time function, S is the modified source-time function, and * represents complex conjugation. Equation 6 corresponds to the cross-correlation operation and equation 7 represents deconvolution between the two different wave modes. Note that $S(\omega)$ is always independent of the phase of $s(\omega)$ (equations 6 and 7), and also becomes independent of the amplitude of $s(\omega)$ when deconvolution is employed (equation 7). Therefore, the phase of the original source-time function $s(\omega)$ is eliminated by the above operations, thereby compressing all relevant information in the initial portion of the causal part of $d_{sp}$. As a final step of the compression process, $d_s p$ is truncated in time, wherein the acausal part (time<0) is discarded and the causal part (time>0) is truncated at a predetermined time value ascertained by the maximum expected time interval between the elastic wave modes originating from the sources. Note that time and frequency domains are related by Fourier Transforms.

In order to eliminate the effect of the sign of the source radiation pattern and the polarity of compressional-wave and shear-waves on inversion, the above operation may be performed on envelope data generated from the waveform data. The envelope data are the amplitude of the analytic signal whose real and imaginary parts are related to each other by the Hilbert Transform.

Human activity within the substrate, such as hydraulic fracturing for example, produces waves which necessarily travel through the substrate. Human activity thus produces sounding, whereby relevant data sets are generable. Once waveform data has been cross-correlated or deconvolved to generate relevant data sets, the relevant data are subjected to waveform tomography and waveform inversion whereby velocity distribution and hypocenter imaging is ascertainable from data sensed at each sensor location. A subsurface map is thus generable.

Changes to the substrate, resulting from activity therein, such as, for example hydraulic fracturing, are thereby expediently monitorable continuously, whereby extent of a particular fracture, for example, is ascertainable and effects of human and other activity within the substrate thereby mappable. This is especially useful when conducting such human activity proximal to aquifers and other subsurface waterways or when a wellhead is located proximally to human habitation.

Control hypocenters are usable, whereby a known distance to a particular at least one sensor enables tomography be applied for an initial determination of velocity distribution within a particular substrate, as case may be.

Seismic waveforms are elastic and acoustic waves that travel through the Earth's layers. The preferred embodiment employs seismic data acquired during hydraulic fracturing operations. These data are routinely recorded, and those of skill in the art are familiar with working with such data. Other elastic and acoustic wave data are available that would be suitable for alternative embodiments of the subject matter of the disclosure. Examples are mapping using earthquake data, detection of buried mines, detection of defects and damages in any material medium, and imaging human tissue. Those in the art will understand that the method described herein may be used in any suitable medium that supports propagation of elastic and acoustic waves.

Thus has been broadly outlined the more important features of the present method for expediently processing seismic data for subsurface mapping so that the detailed description thereof that follows may be better understood and in order that the present contribution to the art may be better appreciated.

For better understanding of the method for expediently processing seismic data for subsurface mapping, its operating advantages and specific objects attained by its uses, refer to the accompanying drawings and description.

DRAWINGS

Figures

For a more complete understanding of the invention, reference is made to the following description and accompanying drawings, in which.

DETAILED DESCRIPTION

Figure 1:
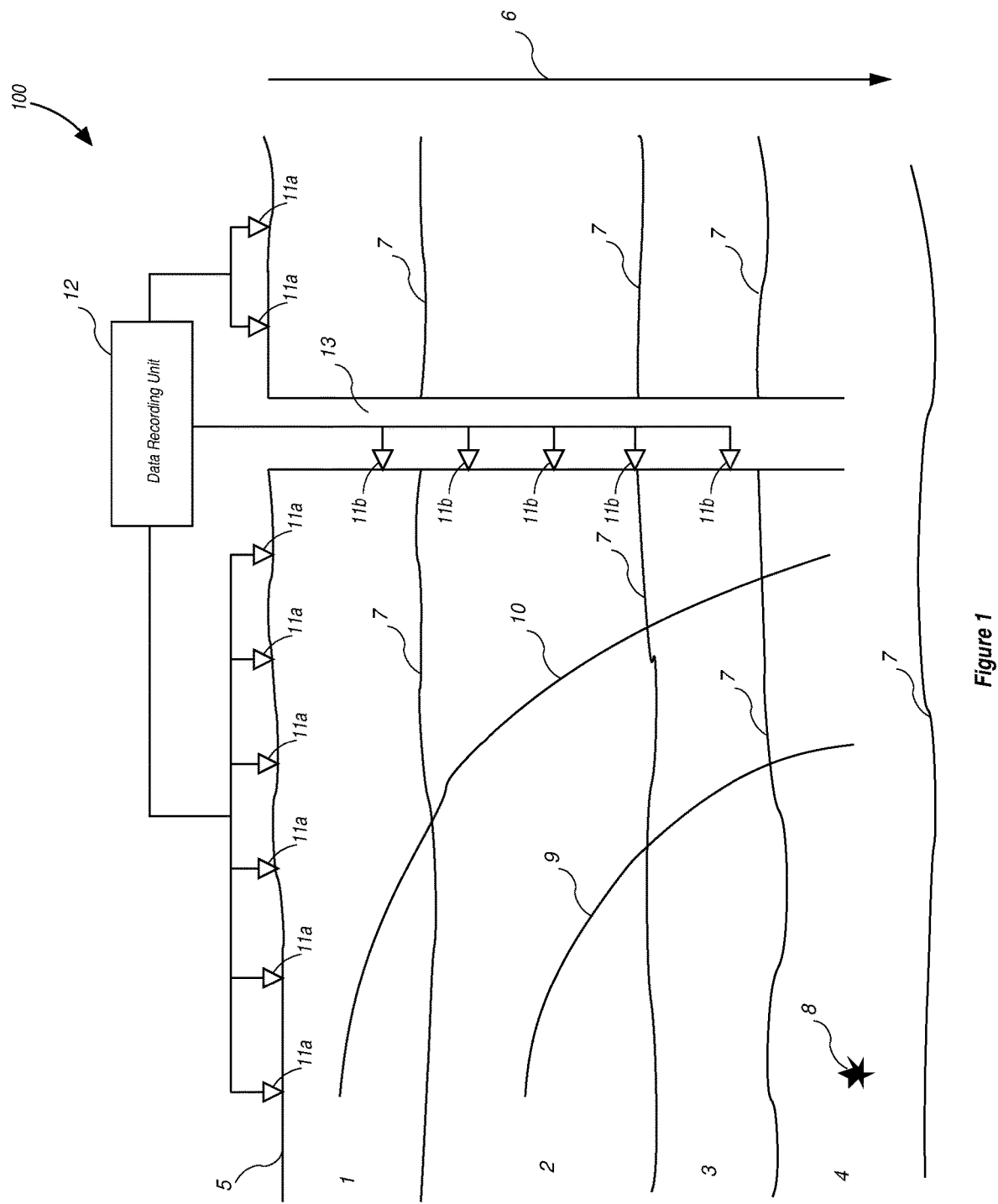
FIG. 1 illustrates an example embodiment of an arrangement of surface and subsurface sensors positioned to monitor incidence of P-waves and S-waves recordable within said substrate.
Figure 2:
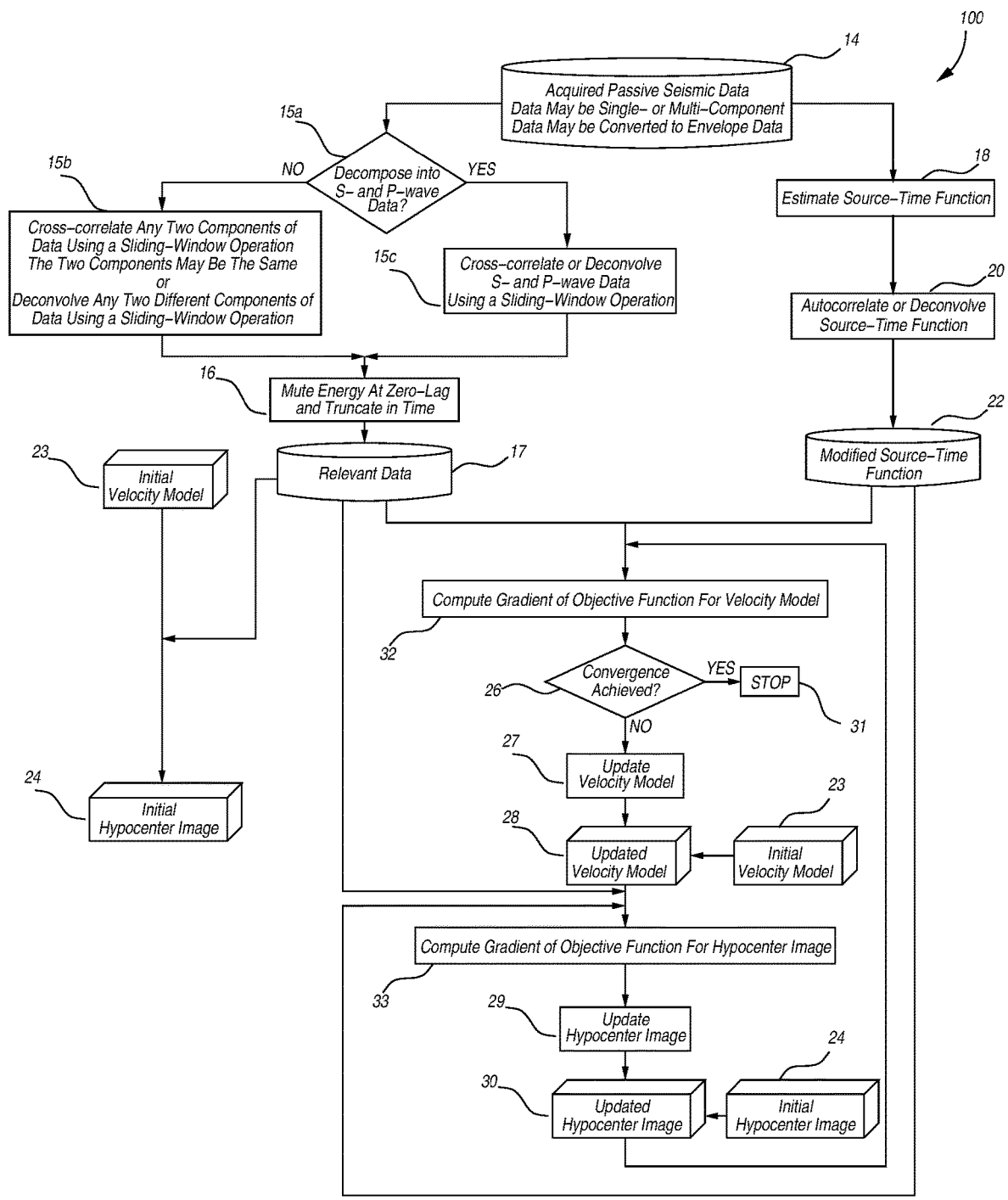
FIG. 2 is a flow chart illustrating an example embodiment of steps of the present method through sequential inversion whereby hypocenter imaging is updateable subsequent each updated velocity model within each iteration.
Figure 3:
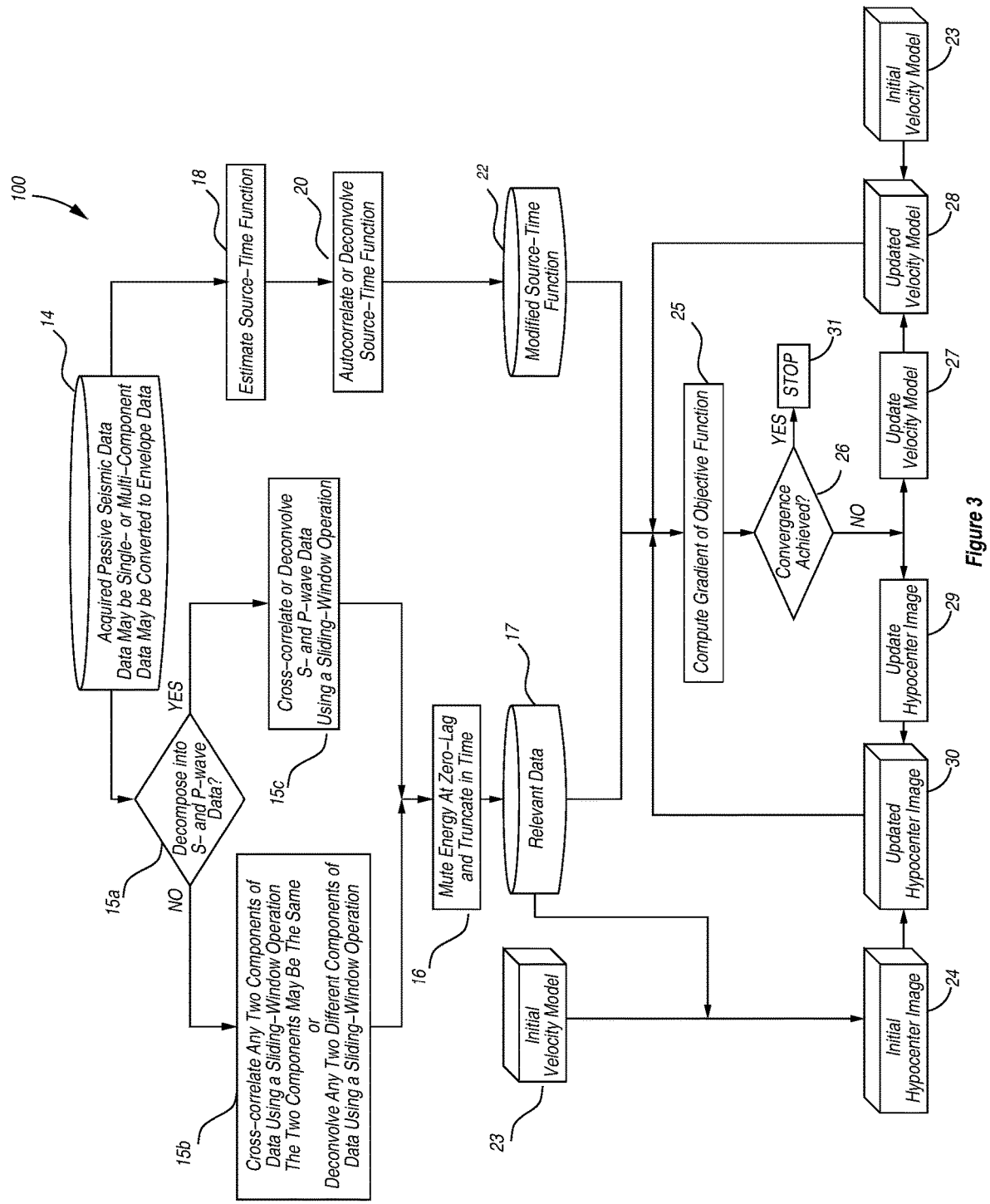
FIG. 3 is a flow chart illustrating an example embodiment of steps of the present method through simultaneous inversion whereby hypocenter imaging is updateable concurrent each updated velocity model within each iteration.

With reference now to the drawings, and in particular FIG. 1 through FIG. 3 thereof, example of the instant method for expediently processing seismic data for subsurface mapping with waveform inversion employing the principles and concepts of the present method for expediently processing seismic data for subsurface mapping with waveform inversion and generally designated by the reference number 100 will be described.

Referring to FIG. 1 through FIG. 3 an example embodiment of the method for expediently processing seismic data for subsurface mapping with waveform inversion 100 is illustrated.

The present method for expediently processing seismic data for subsurface mapping with waveform inversion 100 includes acquiring seismological waveform data 14 in situ from an arrangement of sensors, 11a and 11b, over a determinable time period. The present method is usable upon waveform data 14 acquired by single component and multicomponent sensors, as case may be. Once waveform data 14 is produced, waveform data 14 is either auto-correlated, cross-correlated, or deconvolved or decomposed into shear- and compressional-waveforms which are thereafter cross-correlated or deconvolved over said time period to generate a waveform comprising a phase difference of each compressional-wave and shear-wave incident sensed at each sensor location, and a relevant waveform data set 17 for each sensor location is thereby generated. Waveform data 14 continuously collected over an extended time period is thus reduced to relevant data sets 17 readable in seconds.

Waveform inversion of each relevant data set 17 determines subsurface velocity distribution and source properties distribution across the substrate and a subsurface map is thereby generable. The inverted velocity is inversely proportional to the difference between the compressional-wave and shear-wave slowness of the substrate.

Monitoring velocity distribution across the substrate during subsurface activity therein, by continuously generating relevant data sets at each sensor location, thence provides updatable mapping across the scope of said subsurface activity.

FIG. 1 illustrates a diagrammatic longitudinal section of a substrate beneath surface 5 to depth 6 having an arrangement of surface sensors 11a and subsurface sensors 11b disposed appropriately to monitor seismic activity therein. Sensors 11a and 11b are connected with a data recording unit 12 wherein waveform data are storable and communicable to remote users.

Compressional-wave 10 and shear-wave 9, generated at hypocenter 8, are transmitted through subsurface geologic strata 1, 2, 3, and 4, and thence recorded when incident each of sensors 11a and 11b. Incidence of compressional-wave 10 and shear-wave 9 are enumerated as waveform data 14 for cross-correlation or deconvolution 15b,c wherein a waveform is generative comprising the phase difference between said compressional-wave and shear-wave incidents whereby waveform data 14 is reduced to relevant data sets 17. Waveform data 14 is thereby compressed for expedited processing to generate subsurface high resolution mapping by waveform inversion.

Referring to FIG. 2 and FIG. 3, waveform data 14 is auto-correlated, cross-correlated, or deconvolved using a sliding-window operation 15b,c and energy is suppressed at zero-lag 16 whereby sequential data are processed to delimit relevant data sets 17 from raw waveform data 14. Initial hypocenter image 24 is thus generated by reverse time migration of the relevant data using the initial velocity model 23. Independently, source-time function is estimated 18 from raw waveform data 14 and auto-correlated (or deconvolved) 20 to produce a modified source-time function 22. If shear-wave and compressional-wave decomposition 15a is performed 15c using a polarization filter, then the envelope data may be generated from the decomposed shear- and compressional-waveforms (instead of prior to the shear-wave and compressional-wave decomposition 15a).

Relevant data sets 17 are then processed in conjunction with the modified source-time function 22 to compute the gradient of objective function 25. Convergence 26 of synthetic data with relevant data sets 17 updates hypocenter imaging 29 and velocity distribution 27 assessed the substrate, whereby updatable high resolution mapping of the substrate is enabled. At least one iteration is performed.

When convergence 26 is achieved, the process is ended. When convergence 26 is not achieved, the velocity model is updated 27 and the hypocenter image is updated 29 to compute the gradient of objective function 25 until convergence is met.

As shown in FIG. 2, updating of the velocity model 27 and the hypocenter image 29 may be performed sequentially, or, as shown in FIG. 3, concurrently, as desired. Update of the velocity model 27 results in an updated velocity model 28 and update of the hypocenter image 29 results in an updated hypocenter image 30.

Thus a high resolution map is generable and updatable from continuously sourced waveform data 14 acquired at an arrangement of sensors 11a, 11b disposed appropriate to record seismic activity within a substrate, and seismic data affected during activity within said substrate is thereby usable to generate relevant data sets to which waveform inversion is specifically applied to rapidly and efficiently determine velocity distributions and hypocenter image within said substrate.

Many examples of equations and mathematical expressions have been provided in this disclosure. But those with skill in the art will appreciate that variations of these expressions and equations, and related expressions and equations that can be derived from the example equations and expressions provided herein may also be successfully used to perform the methods, techniques, and work-flows related to the embodiments disclosed herein.

While illustrative embodiments of the invention have been illustrated and described, it will be appreciated that various changes can be made therein without departing from the scope of the invention. For example, reduction of recorded data might not be necessary but waveform inversion, as set forth in the present invention, may be used for obtaining physical properties of a material medium and a source properties distribution. On other instances, only data reduction, as set forth in the present invention, may be used to expedite other processing and inversion.

EXAMPLE

FIG. 4 through FIG. 12 present a synthetic example of reducing the volume of microseismic data and inverting the resulting waveforms for obtaining said velocity combination V and source amplitude distribution using the method described in this invention.

Figure 4:
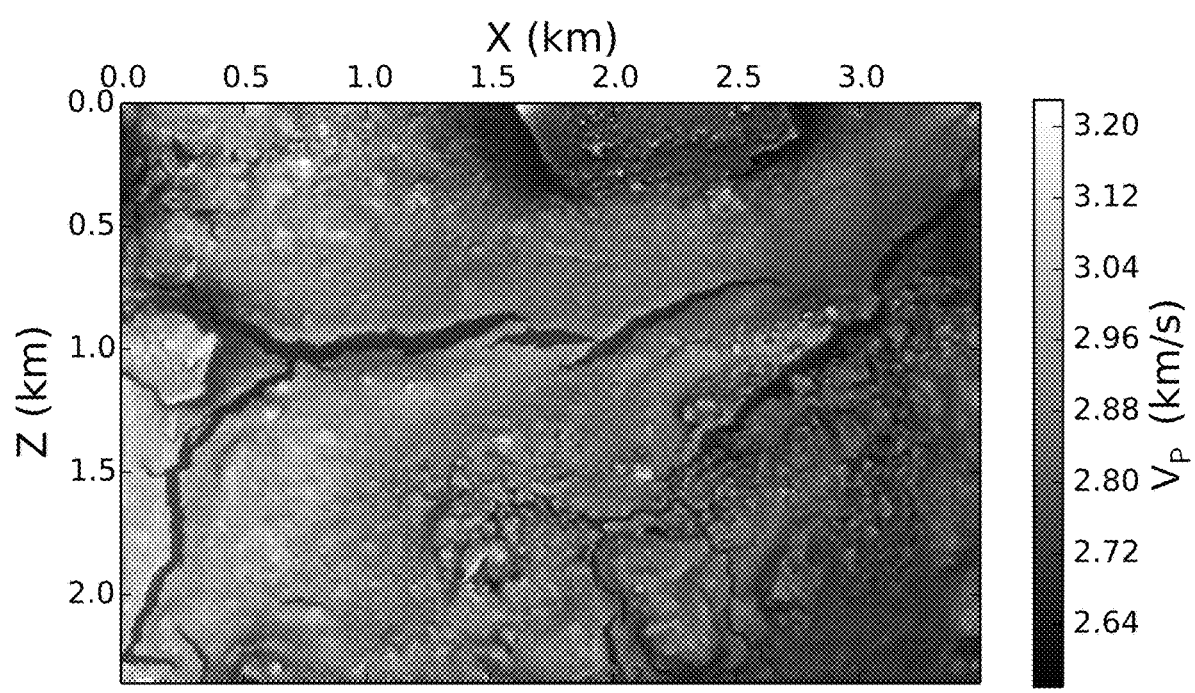
FIG. 4 shows the compressional-wave velocity model $V_P$ used in generating the measured compressional-wave data.
Figure 5:
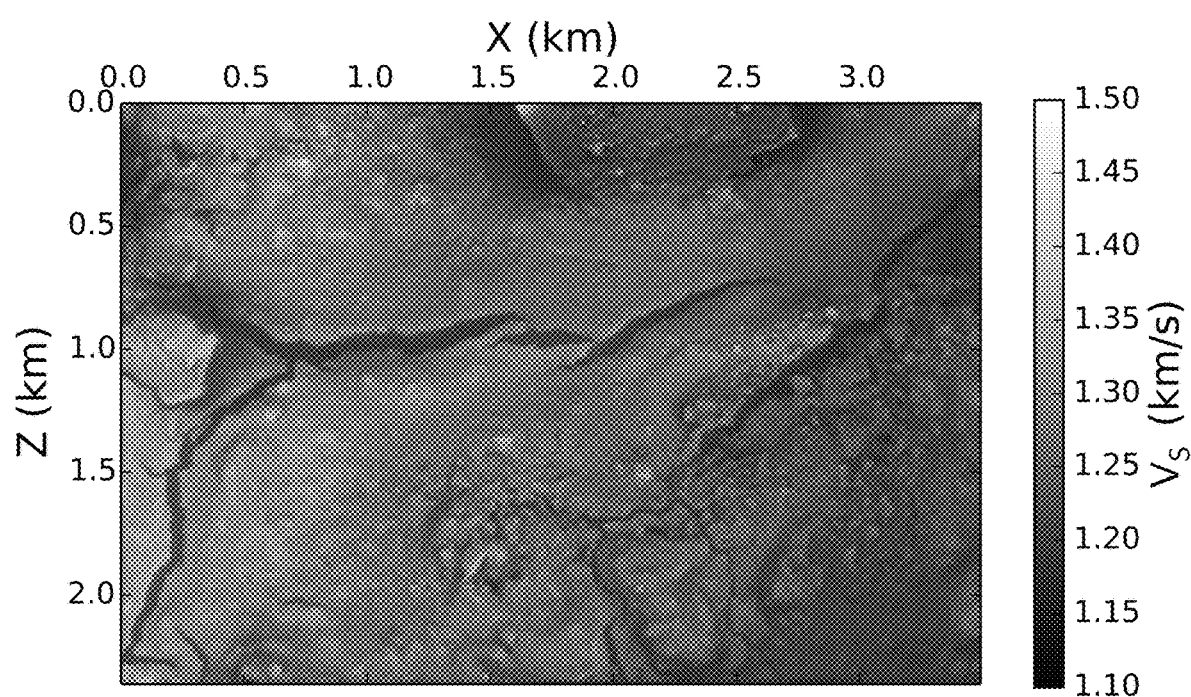
FIG. 5 shows the shear-wave velocity model $V_S$ used in generating the measured shear-wave data.

FIG. 4 is the true compressional-wave velocity model $V_P$ that is used to generate the compressional-wave data. FIG. 5 is the true shear-wave velocity model $V_S$ that is used to generate the shear-wave data. The spatial extent of the model is 3.5 km in the x-direction and 2.37 km in the z-direction.

Figure 6:
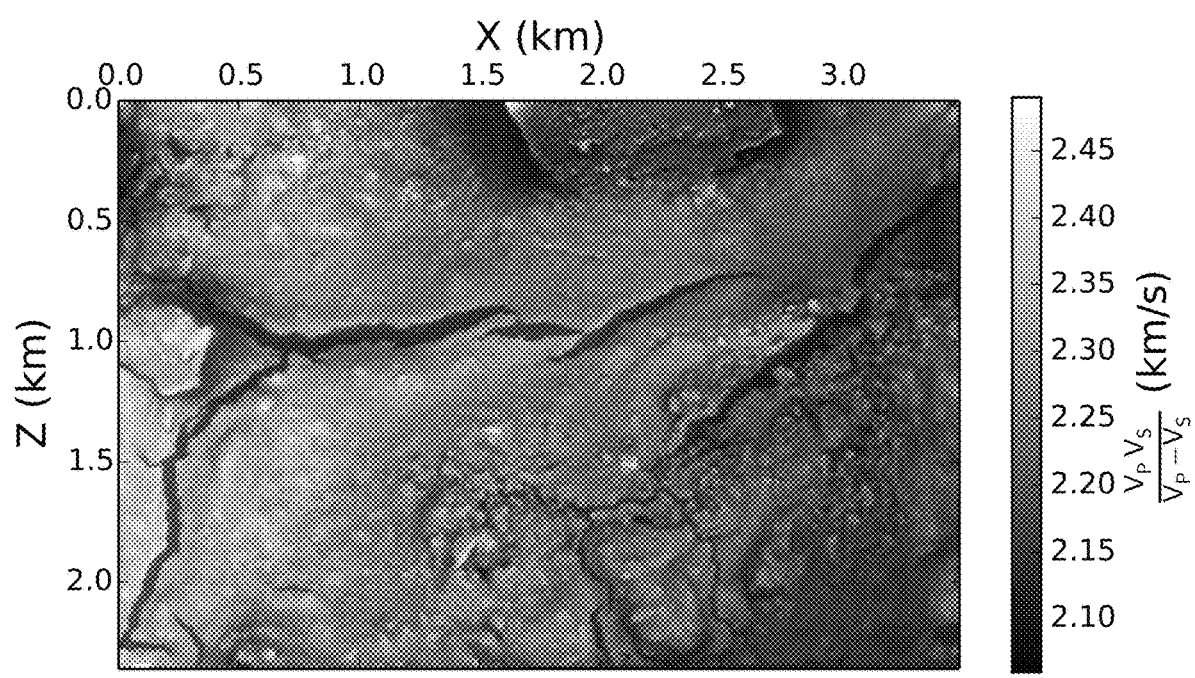
FIG. 6 shows the velocity combination $V=V_P V_S/(V_P-V_S)$ of said velocity models in FIG. 4 and FIG. 5.

FIG. 6 shows the true compressional- and shear-wave velocity model combination $V=V_P V_S/(V_P-V_S)$ of the velocity models in FIG. 4 and FIG. 5 that the reduced waveforms are sensitive to.

Figure 7:
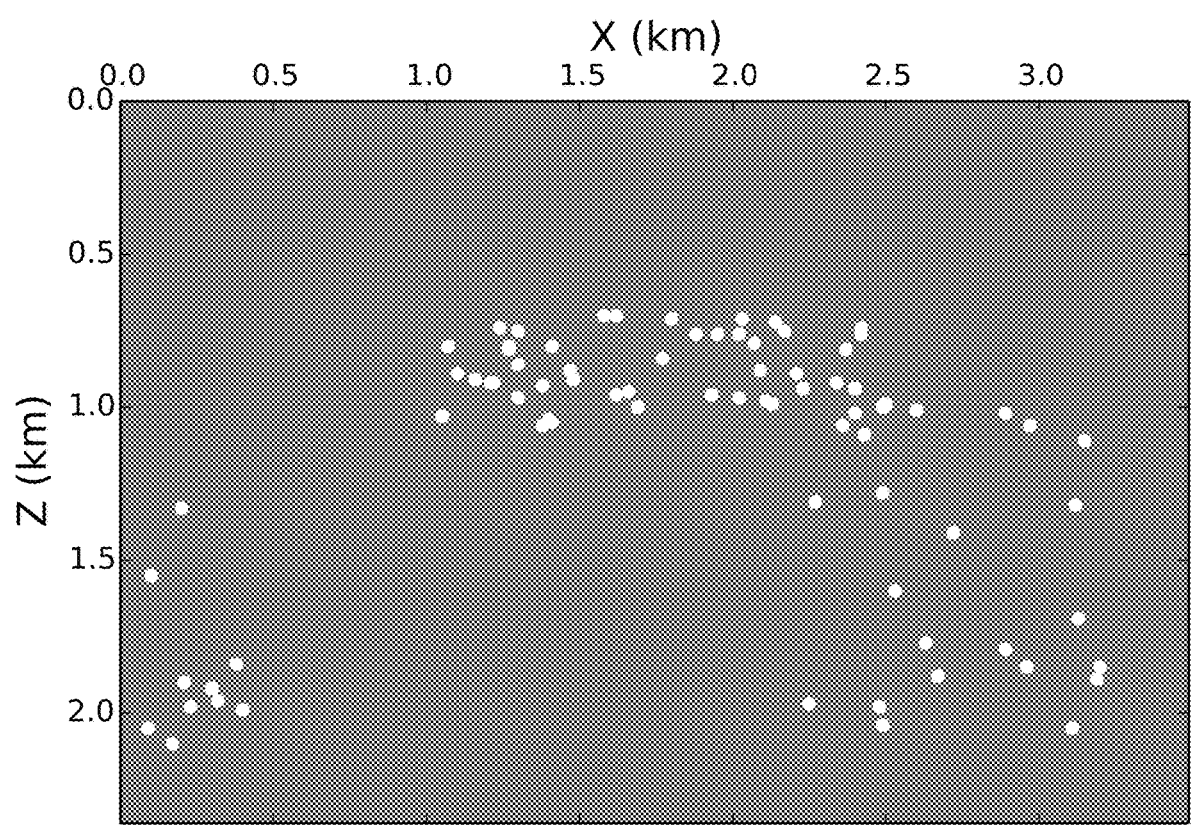
FIG. 7 shows the locations of 80 sources used in generating the elastic wave data.

FIG. 7 shows the spatial locations of 80 sources used in generating the compressional- and shear wave data. The amplitudes of all the sources are the same and equal to unity. Receivers are located on all four boundaries of the model at an interval of 20 m.

Figure 8:
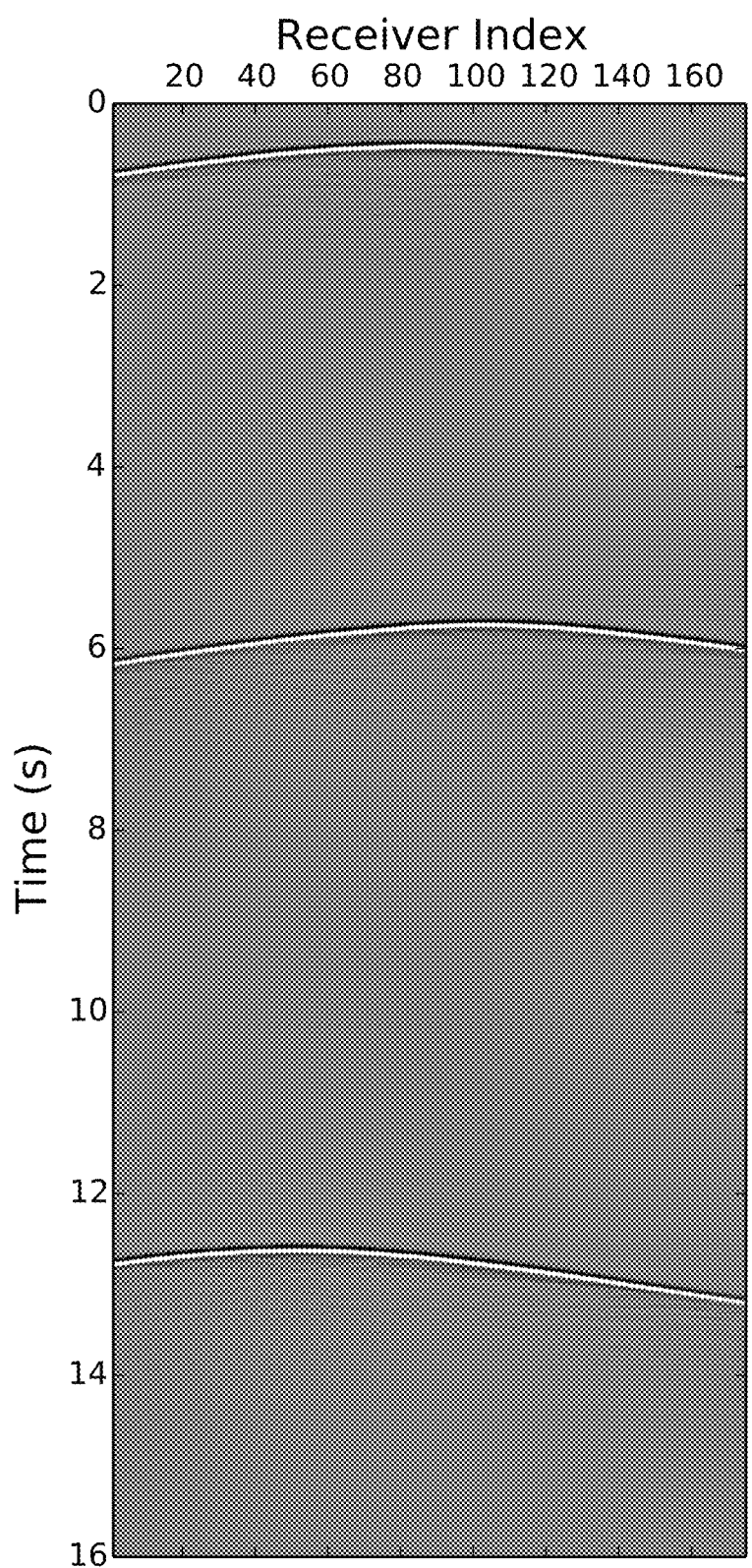
FIG. 8 shows a time-gated portion of the compressional-wave data recorded at the receivers on the top boundary of the model. The whole record spans over 10 minutes and is not shows here.
Figure 9:
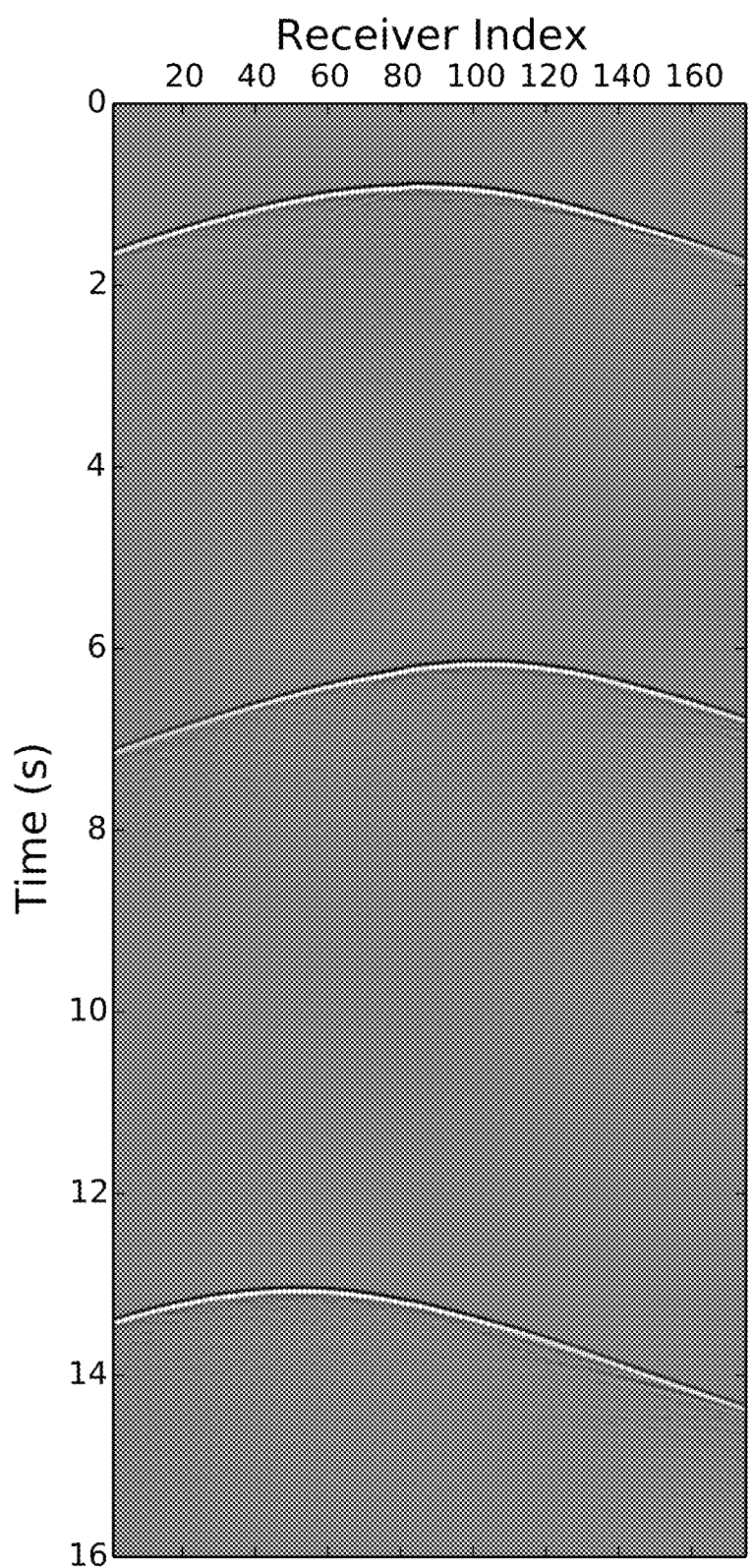
FIG. 9 shows a time-gated portion of the shear-wave data recorded at the receivers on the top boundary of the model. The complete record spans over 10 minutes and is not shows here.

Time-gated portions of the generated compressional- and shear-wave data are shown in FIG. 8 and FIG. 9, respectively. The complete data record spans about 10 minutes in this test example and is not shown here.

Figure 10:
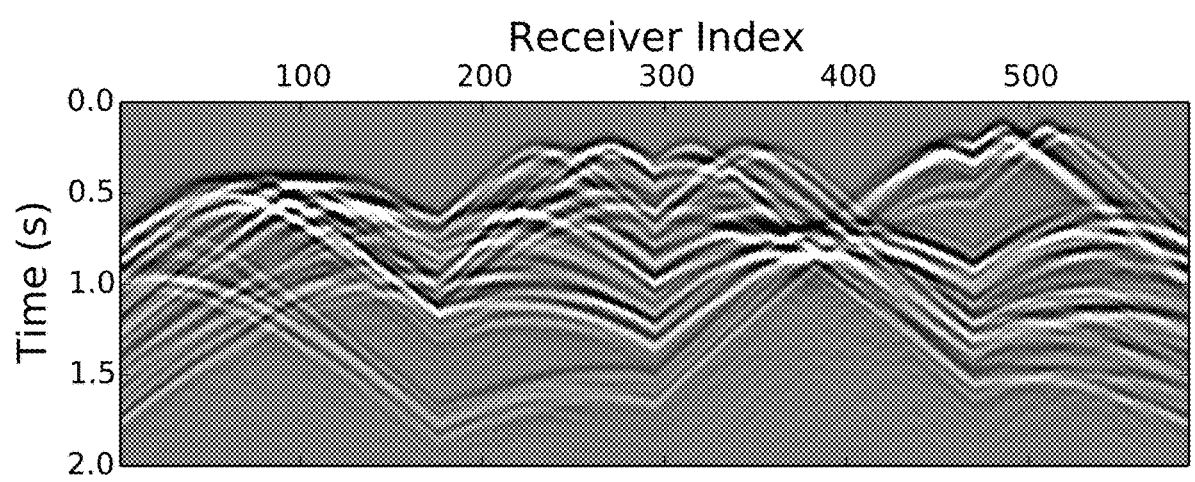
FIG. 10 shows the waveforms obtained by a moving-window deconvolution of the shear- and compressional-waveforms in FIG. 9 and FIG. 8 at each receiver. The energy about zero-lag has been suppressed.

FIG. 10 shows the reduced waveform data obtained from the compressional- and shear-wave data in FIG. 8 and FIG. 9 using deconvolution. A time gate size of 2 sec was used to generate the waveforms in FIG. 10. Also, the energy about zero-lag has been suppressed. Note that the original recorded data spanning about 10 minutes has been reduced to only 2 seconds which will substantially reduce the computational time involved in waveform inversion.

Figure 11:
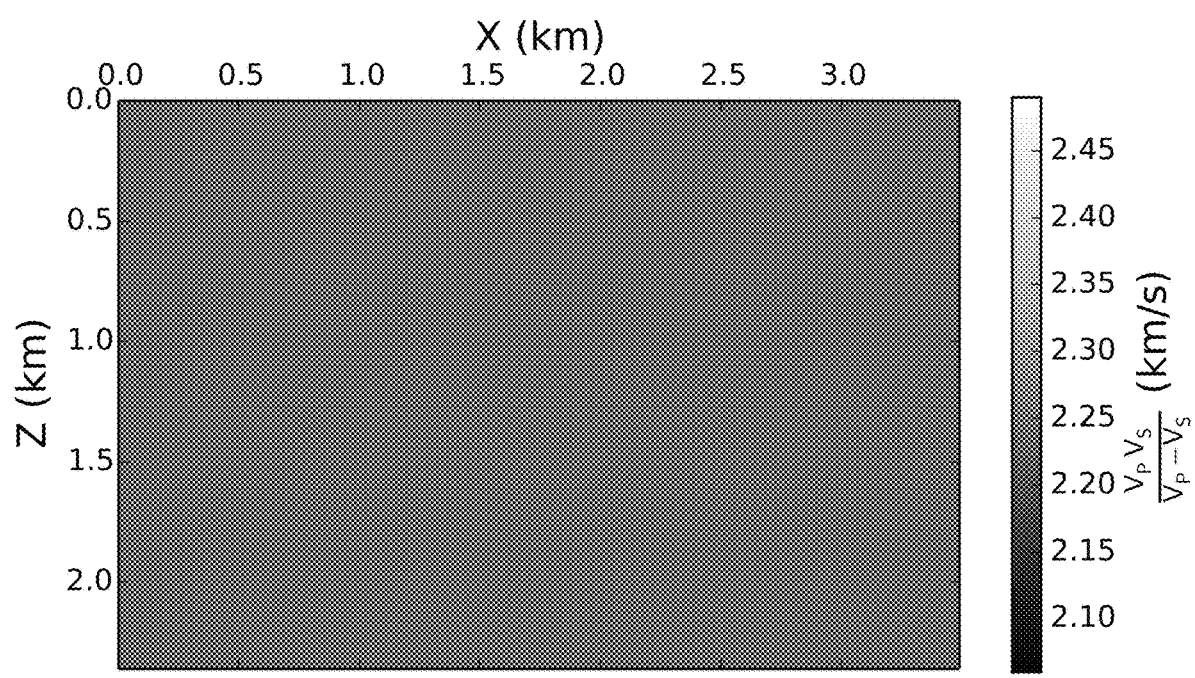
FIG. 11 shows the starting velocity model for waveform inversion in the test example.

FIG. 11 shows a homogeneous starting velocity model used in waveform inversion. Because of weak velocity heterogeneities, a homogeneous starting velocity model was sufficient for this test example. Since waveform inversion is a highly nonlinear problem, a good starting velocity model may be necessary is cases with complicated velocity models.

Note that no prior knowledge of source amplitude distribution was used in starting the waveform inversion.

Figure 12:
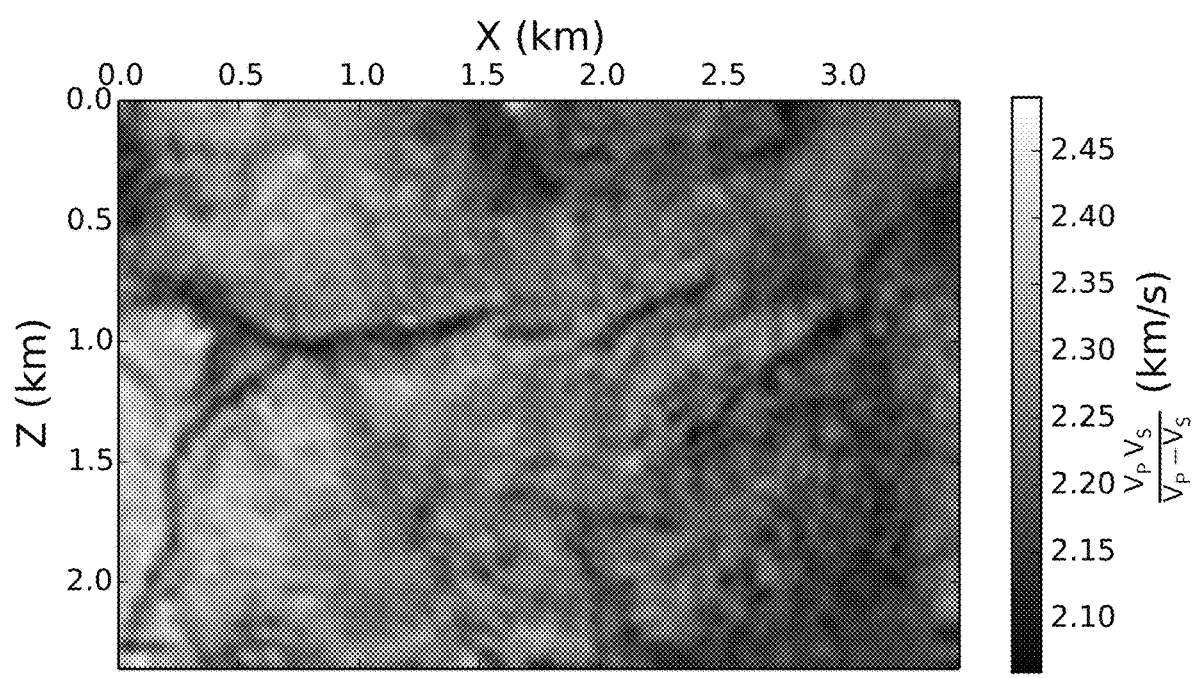
FIG. 12 shows the velocity model obtained using waveform inversion.
Figure 13:
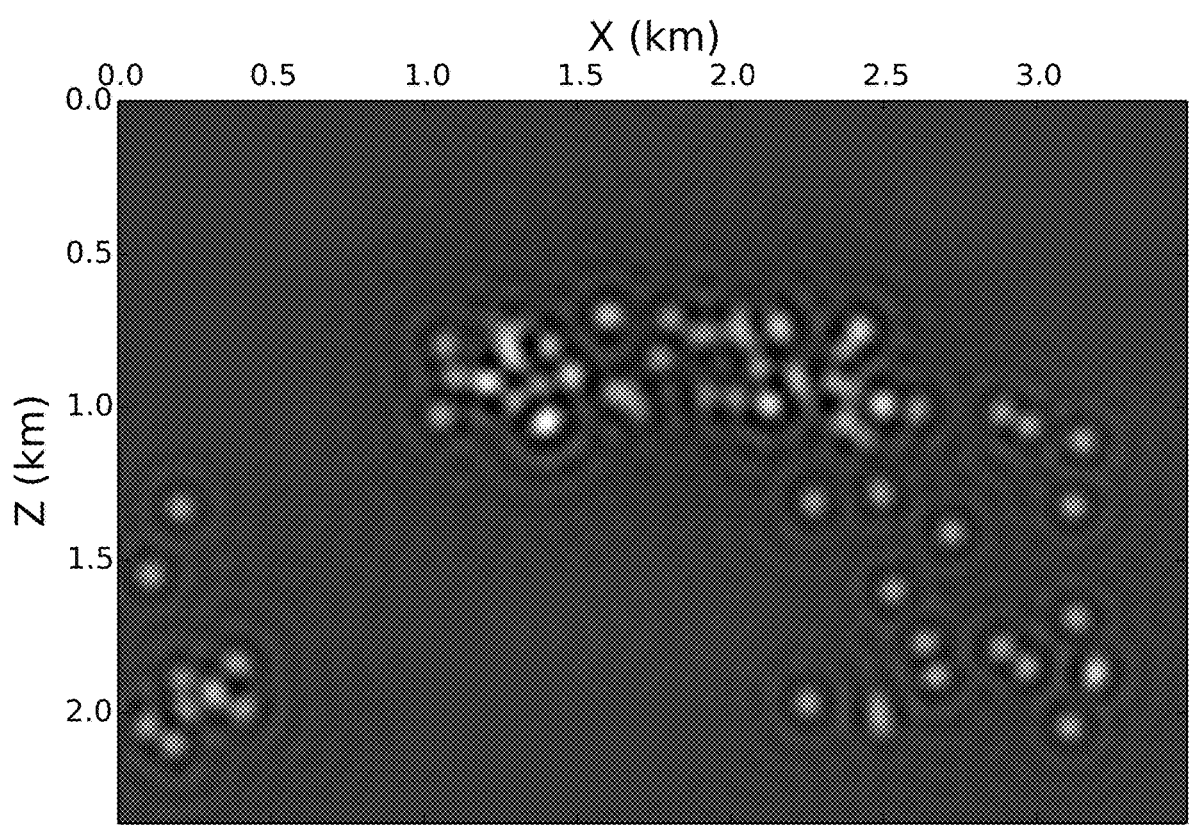
FIG. 13 shows the source amplitude model obtained using waveform inversion.

FIG. 12 shows the velocity model obtained using waveform inversion of the waveform data using the method described in this invention in FIG. 10. The source amplitude distribution obtained during the same inversion is shown in FIG. 13. The Limited-memory Broyden-Fletcher-Goldfarb-Shanno optimization algorithm [19] was used in solving the inversion problem. Comparisons of FIG. 12 with FIG. 6 and FIG. 13 with FIG. 7 demonstrate that the waveform inversion method described in this invention was successful at obtaining a reasonable model.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, at least some of the steps in the present inventive method are performed on a computer, i.e. the invention is computer implemented. In such cases, the resulting updated physical properties model and the updated source properties model may either be downloaded, displayed, or saved to computer storage.

REFERENCES

[1] C. A. Tosaya, "Acoustical properties of clay-bearing rocks," Ph.D. dissertation, Stanford University, 1982.

[2] J. T. Rutledge and W. S. Phillips, "Hydraulic stimulation of natural fractures as revealed by induced microearthquakes, carthage cotton valley gas field, east texas," Geophysics, vol. 68, no. 2, pp. 441-452, 2003. [Online]. Available: http://dx.doi.org/10.1190/1.1567214

[3] K. Chambers, S. Brandsberg-Dahl, J. Kendall, and J. Rueda, "Testing the the ability of surface arrays to locate microseismicity," SEG Technical Program Expanded Abstracts, pp. 1436-1440, 2008. [Online]. Available: http://library.seg.org/doi/abs/10.1190/1.3059380

[4] M. Hall and J. E. Kilpatrick, "Surface microseismic monitoring of slick-water and nitrogen fracture stimulations, arkoma basin, oklahoma," SEG Technical Program Expanded Abstracts, pp. 1562-1565, 2009. [Online]. Available: http://library.seg.org/doi/abs/10.1190/1.3255147

[5] B. Artman, I. Podladtchikov, and B. Witten, "Source location using time-reverse imaging," Geophysical Prospecting, vol. 58, no. 5, pp. 861-873, 2010. [Online]. Available: http://dx.doi.org/10.1111/j.1365-2478.2010.00911.x

[6] S. C. Maxwell, J. Rutledge, R. Jones, and M. Fehler, "Petroleum reservoir characterization using downhole microseismic monitoring," GEO-PHYSICS, vol. 75, no. 5, pp. 75A129-75A137, 2010. [Online]. Available: http://dx.doi.org/10.1190/1.3477966

[7] J. P. Verdon, J.-M. Kendall, and S. C. Maxwell, "A comparison of passive seismic monitoring of fracture stimulation from water and co2 injection," *GEOPHYSICS*, vol. 75, no. 3, pp. MA1-MA7, 2010. [Online]. Available: http://dx.doi.org/10.1190/1.3377789

[8] J. Virieux and S. Operto, "An overview of full-waveform inversion in exploration geophysics," *Geophysics*, vol. 74, no. 6, pp. WCC1-WCC26, 2009. [Online]. Available: http://link.aip.org/link/?GPY/74/WCC1/1

[9] P. Lailly, "The seismic inverse problem as a sequence of before stack migrations," in *Abstracts*. Society of Industrial and Applied Mathematics, 1984, pp. 206-220.

[10] A. Tarantola, "Inversion of seismic reflection data in the acoustic approximation," *Geophysics*, vol. 49, no. 8, pp. 1259-1266, 1984. [Online]. Available: http://link.aip.org/link/?GPY/49/1259/1

[11] R. Kamei and D. Lumley, "Passive seismic imaging and velocity inversion using full wavefield methods," *SEG Technical Pro-gram Expanded Abstracts*, pp. 2273-2277, 2014. [Online]. Available: http://library.seg.org/doi/abs/10.1190/segam2014-0948.1

[12] J. Tromp, C. Tape, and Q. Liu, "Seismic tomography, adjoint methods, time reversal and banana-doughnut kernels," *Geophysical Journal International*, vol. 160, no. 1, pp. 195-216, 2005. [Online]. Available: http://dx.doi.org/10.1111/j.1365-246X.2004.02453.x

[13] Q. Liu and J. Tromp, "Finite-frequency kernels based on adjoint methods," *Bulletin of the Seismological Society of America*, vol. 96, no. 6, pp. 2383-2397, December 2006.

[14] Y. Kim, Q. Liu, and J. Tromp, "Adjoint centroid-moment tensor inversions," *Geophysical Journal International*, vol. 186, no. 1, pp. 264-278, 2011. [Online]. Available: http://dx.doi.org/10.1111/j.1365-246X.2011.05027.x

[15] C. Tape, Q. Liu, A. Maggi, and J. Tromp, "Adjoint tomography of the southern california crust," *Science*, vol. 325, no. 5943, pp. 988-992, 2009. [Online]. Available: http://www.sciencemag.org/content/325/5943/988.abstract

[16] A. Askan, "Full waveform inversion for seismic velocity and anelastic losses in heterogeneous structures," Ph.D. dissertation, Carnegie Mellon University, 2006.

[17] R.-E. Plessix, "A review of the adjoint-state method for computing the gradient of a functional with geophysical applications," *Geophysical Journal International*, vol. 167, no. 2, pp. 495-503, 2006. [Online]. Available: http://dx.doi.org/10.1111/j.1365-246X.2006.02978.x

[18] O. Jarillo Michel and I. Tsvankin, "Gradient calculation for waveform inversion of microseismoic data in vti media," *Journal of Seismic Exploration*, vol. 23, no. 3, pp. 201-207, 2014.

[19] J. Nocedal and S. J. Wright, *Numerical Optimization*, 2nd ed. New York: Springer, 2006.

What is claimed is:

1. A method for compressing the amount of elastic wave data, for eliminating the source-time functions, and for simulating composite impulse responses, comprising the steps of:
   (a) recording elastic wave data in at least one spatial location that includes at least one directional component of particle displacement, velocity, or acceleration and said elastic data originating from at least one source selected from the group consisting of man-made and natural sources, and
   (b) using at least one operation selected from the group consisting of auto-correlation, cross-correlation, and deconvolution, on said elastic data, thereby generating waveforms containing the phase difference between compressional-wave mode and slow-shear-wave mode, or any two different elastic wave modes, selected from the group consisting of compressional-wave mode, fast-shear-wave mode, and slow-shear-wave mode, and
   (c) discarding the acausal part, and
   (d) truncating the causal part at a predetermined time value ascertained by the maximum expected time interval between the said elastic wave modes originating from said sources,
   whereby said elastic wave data are compressed, and
   whereby either the phase or both the amplitude and phase of the source-time functions of sources generating said elastic waves are eliminated, and whereby the said computed waveform at each sensor represents the composite impulse response between the sources and the said sensor.

2. The method in claim 1, wherein said elastic wave data are pre-processed to separate said elastic wave modes.

3. The method in claim 1, wherein the amplitude about zero time-lag of said computed waveforms is suppressed.

4. The method in claim 1, wherein said elastic wave data are pre-processed to generate envelope functions in time, whereby the sign of the source radiation pattern is eliminated.

5. A system for compressing the amount of elastic wave data, for eliminating the source-time functions, and for simulating composite impulse responses, comprising:
   (a) a data recording system comprising of one or more computers, data recording hardware, and one or more elastic wave sensors that include at least one directional component of particle displacement, velocity, or acceleration, that record elastic wave data in at least one spatial location and said elastic data originating from at least one source selected from the group consisting of man-made and natural sources, and
   (b) a processor that uses at least one operation selected from the group consisting of auto-correlation, cross-correlation, and deconvolution, on said elastic data, thereby generating waveforms containing the phase difference between compressional-wave mode and slow-shear-wave mode, or any two different elastic wave modes, selected from the group consisting of compressional-wave mode, fast-shear-wave mode, and slow-shear-wave mode, and
   (c) wherein the processor further discards the acausal part, and
   (d) wherein the processor further truncates the causal part at a predetermined time value ascertained by the maximum expected time interval between the said elastic wave modes originating from said sources,
   whereby the system compresses said elastic wave data, and
   whereby the system eliminates either the phase or both the amplitude and phase of the source-time functions of sources generating said elastic waves, and whereby the system simulates the composite impulse response between the sources and each sensor.

6. The system in claim 5, wherein the processor pre-processes said elastic wave data to separate said elastic wave modes.

7. The system in claim 5, wherein the processor further suppresses the amplitude about zero time-lag of said computed waveforms.

8. The system in claim 5, wherein the processor preprocesses said elastic wave data to generate envelope functions in time, thereby eliminating the sign of the source radiation pattern.

9. A method for efficient imaging of acoustic or processed elastic wave data using the inhomogeneous acoustic wave equation $$m(x)\frac{\partial^2 u(x,t)}{\partial t^2} - \nabla^2 u(x,t) = f(x,t),$$

where x represents space, t is time, m(x) represents the material medium properties, $\mu(x,t)$ is the wavefield that may be a scalar or a vector field, $f(x,t)$ represents the sourcing function in space and time, said method comprising the steps of:
(a) modifying said sourcing function in said inhomogeneous acoustic wave equation to the mathematical product of a time-independent source attribute defined at every location in space within said material medium and a space-independent source-time function given by $$m(x)\frac{\partial^2 u(x,t)}{\partial t^2} - \nabla^2 u(x,t) = A(x)S(t),$$

where S(t) is the said space-independent source-time function, A(x) represents the said time-independent source attribute,
(b) recording acoustic wave data or using wave data obtained through processing in at least one spatial location, and
(c) generating an initial source attributes model and an initial material medium properties model, said initial source attributes model optionally comprising only null values at all spatial locations within said material medium, and
(d) simulating synthetic wave data using the source properties model and the material medium properties model, and
(e) computing an objective function that is a measure of the discrepancy between said simulated wave data and said recorded or pre-processed wave data, and
(f) computing the gradients of said objective function with respect to the source attributes model and material medium properties model given by $$g_A(x) = \int_0^T u^\dagger(x, T-t)S(t)dt,$$

and $$g_m(x) = m^\dagger(x)\int_0^T u^\dagger(x, T-t)\frac{\partial^2 u(x,t)}{\partial t^2}dt,$$

where $\mu^\dagger$ represents the adjoint wavefield, $g_A(x)$ is the gradient of said objective function with respect to said source attributes model, $g_m(x)$ is the gradient of said objective function with respect to said material medium properties model, and $m'(x)=2/V(x)^3$ if $m(x)=V(x)$, and $m'(x)=-2/V(x)$ if $m(x)=1/V(x)$, and $m'(x)=-1$ if $m(x)$ $1/V(x)^2$, and
(g) updating said source attributes model and said material medium properties model using $$A(x)_{updated} = A(x) - \alpha_A g_A(x),$$

and $$m(x)_{updated} = m(x) - \alpha_m g_m(x),$$

where $A(x)_{updated}$ is the updated source attributes model, $m(x)_{updated}$ is the updated material medium properties model, $\alpha_A$ and $\alpha_m$ are one-dimensional minimizers of said objective function along vectors $A(x)-\alpha_A g_A(x)$ and $m(x)-\alpha_m g_m(x)$, respectively, optionally replaced by the Hessian or the pseudo-Hessian, and
(h) optionally iterating steps (d)-(g) at least once more, wherein said updated source attributes model and said updated material medium properties model of step (g) are used in step (d) to simulate synthetic wave data, thereby resulting in a further updated source attributes model and a further updated material medium properties model.

10. A system for efficiently imaging acoustic or processed elastic wave data using the inhomogeneous acoustic wave equation $$m(x)\frac{\partial^2 u(x,t)}{\partial t^2} - \nabla^2 u(x,t) = f(x,t),$$

where x represents space, t is time, m(x) represents the material medium properties $\mu(x,t)$ is the wavefield that may be a scalar or a vector field, $f(x,t)$ represents the sourcing function in space and time, said system comprising:
(a) a processor that modifies said sourcing function in said inhomogeneous acoustic wave equation to the mathematical product of a time-independent source attribute defined at every location in space within said material medium and a space-independent source-time function given by $$m(x)\frac{\partial^2 u(x,t)}{\partial t^2} - \nabla^2 u(x,t) = A(x)S(t),$$

where S(t) is the said space-independent source-time function, A(x) represents the said time-independent source attribute,
(b) a data recording system comprising of one or more computers, data recording hardware, and one or more acoustic wave sensors that record acoustic wave data in at least one spatial location, or a data storage drive containing wave data obtained through processing in at least one spatial location, and
(c) wherein the processor further generates an initial source attributes model and an initial material medium properties model, said initial source attributes model optionally comprising only null values at all spatial locations within said material medium, and
(d) wherein the processor further simulates synthetic wave data using the source properties model and the material medium properties model, and
(e) wherein the processor further computes an objective function that is a measure of the discrepancy between said simulated wave data and said recorded or pre-processed wave data, and
(f) wherein the processor further computes the gradients of said objective function with respect to the source attributes model and material medium properties model given by $$g_A(x) = \int_0^T u^\dagger(x, T-t)S(t)dt,$$

and $$g_m(x) = m(x)\int_0^T u^\dagger(x, T-t)\frac{\partial^2 u(x,t)}{\partial t^2}dt,$$

where μt represents the adjoint wavefield, $g_A(x)$ is the gradient of said objective function with respect to said source attributes model, $g_m(x)$ is the gradient of said objective function with respect to said material medium properties model, and $m'(x)=2/V(x)^3$ if $m(x)=V(x)$, and $m'(x)=-2/V(x)$ if $m(x)=1/V(x)$, and $m'(x)=-1$ if $m(x)=1/V(x)^2$, and
  (g) wherein the processor further updates said source attributes model and said material medium properties model using $$A(x)_{updated}=A(x)-\alpha_A g_A(x)$$

and $$m(x)_{updated}=m(x)-\alpha_m g_m(x),$$

where $A(x)_{updated}$ is the updated source attributes model, $m(x)_{updated}$ is the updated material medium properties model, $\alpha_A$ and $\alpha_m$ are one-dimensional minimizers of said objective function along vectors $A(x)-\alpha_A g_A(x)$ and $m(x)-\alpha_m g_m(x)$, respectively, optionally replaced by the Hessian or the pseudo-Hessian, and
  (h) wherein the processor further optionally iterates steps (d)-(g) at least once more, by using said updated source attributes model and said updated material medium properties model of step (g) in step (d), thereby further updating said source attributes model and further updating said material medium properties model.

11. A method for efficient imaging of acoustic or processed elastic wave data using the frequency-domain inhomogeneous acoustic wave equation $$-(m(x)\omega^2+\Delta^2)U(x,\omega)=f(x,\omega),$$

where x represents space, ω is frequency, m(x) represents the material medium properties, U(x,ω) is the wavefield that may be a scalar or a vector field, $f(x, \omega)$ represents the sourcing function in space and frequency, said method comprising the steps of:
  (a) modifying said sourcing function in said frequency-domain inhomogeneous acoustic wave equation to the mathematical product of a frequency-independent source attribute defined at every location in space within said material medium and a space-independent source-time function given by $$-(m(x)\omega^2+\Delta^2)U(x,\omega)=A(x)S(\omega),$$

where S(ω) is the said space-independent source-time function in the frequency domain, A(x) represents the said frequency-independent source attribute, and
  (b) recording acoustic wave data or using wave data obtained through processing in at least one spatial location, and
  (c) transforming said recorded acoustic or pre-processed elastic wave data into the frequency domain, and
  (d) generating an initial source attributes model and an initial material medium properties model, said initial source attributes model optionally comprising only null values at all spatial locations within said material medium, and
  (e) simulating synthetic wave data using the source properties model and the material medium properties model, and
  (f) computing an objective function that is a measure of the discrepancy between said simulated wave data and said recorded or pre-processed wave data, and
  (g) computing the gradients of said objective function with respect to the source attributes model and material medium properties model given by $$g_A(x)=\text{Re}\{U^{t,*}(x,\omega)S(\omega)\},$$

and $$g_m(x)=-\text{Re}\{m'(x)\omega^2 U^{t,*}(x,\omega)U(x,\omega)\},$$

where $U^t$ represents the adjoint wavefield, * represents complex conjugation, Re represents the real part of a complex vector, $g_A(x)$ is the gradient of said objective function with respect to said source attributes model, $g_m(x)$ is the gradient of said objective function with respect to said material medium properties model, and $m'(x)=2/V(x)^3$ if $m(x)=V(x)$, and $m'(x)=-2/V(x)$ if $m(x)=1/V(x)$, and $m'(x)=-1$ if $m(x)=1/V(x)^2$, and
  (h) updating said source attributes model and said material medium properties model using $$A(x)_{updated}=A(x)-\alpha_A g_A(x),$$

and $$m(x)_{updated}=m(x)-\alpha_m g_m(x),$$

where $A(x)_{updated}$ is the updated source attributes model, $m(x)_{updated}$ is the updated material medium properties model, $\alpha_A$ and $\alpha_m$ are one-dimensional minimizers of said objective function along vectors $A(x)-\alpha_A g_A(x)$ and $m(x)-\alpha_m g_m(x)$, respectively, optionally replaced by the scaled Hessian or the scaled pseudo-Hessian, and
  (i) optionally iterating steps (e)-(h) at least once more, wherein said updated source attributes model and said updated material medium properties model of step (h) are used in step (e) to simulate synthetic wave data, thereby resulting in a further updated source attributes model and a further updated material medium properties model.

12. A system for efficiently imaging acoustic or processed elastic wave data using the frequency-domain inhomogeneous acoustic wave equation $$-(m(x)\omega^2+\Delta^2)U(x,\omega)=f(x,\omega),$$

where x represents space, w is frequency, m(x) represents the material medium properties, U(x,ω) is the wavefield that may be a scalar or a vector field, $f(x,\omega)$ represents the sourcing function in space and frequency, said system comprising:
  (a) a processor that modifies said sourcing function in said frequency-domain inhomogeneous acoustic wave equation to the mathematical product of a frequency-independent source attribute defined at every location in space within said material medium and a space-independent source-time function given by $$-(m(x)\omega^2+\Delta^2)U(x,\omega)=A(x)S(\omega),$$

where S(ω) is the said space-independent source-time function in the frequency domain, A(x) represents the said frequency-independent source attribute, and
  (b) a data recording system comprising of one or more computers, data recording hardware, and one or more acoustic wave sensors that record acoustic wave data in at least one spatial location, or a data storage drive containing wave data obtained through processing in at least one spatial location, and (c) wherein the processor further transforms said recorded acoustic or pre-processed elastic wave data into the frequency domain, and (d) wherein the processor further generates an initial source attributes model and an initial material medium properties model, said initial source attributes model optionally comprising only null values at all spatial locations within said material medium, and (e) wherein the processor further simulates synthetic wave data using the source properties model and the material medium properties model, and (f) wherein the processor further computes an objective function that is a measure of the discrepancy between said simulated wave data and said recorded or pre-processed wave data, and (g) wherein the processor further computes the gradients of said objective function with respect to the source attributes model and material medium properties model given by $$g_A(x) = Re\{U^{t,*}(x,\omega)S(\omega)\},$$

and $$g_m(x) = -Re\{m'(x)\omega^2 U^{t,*}(x,\omega)U(x,\omega)\},$$

where $U^t$ represents the adjoint wavefield, * represents complex conjugation, Re represents the real part of a complex vector, $g_A(x)$ is the gradient of said objective function with respect to said source attributes model, $g_m(x)$ is the gradient of said objective function with respect to said material medium properties model, and $m'(x)=2/V(x)^3$ if $m(x)=V(x)$, and $m'(x)=-2/V(x)$ if $m(x)=1/V(x)$, and $m'(x)=-1$ if $m(x)=1/V(x)^2$, and (h) wherein the processor further updates said source attributes model and said material medium properties model using $$A(x)_{updated} = A(x) - \alpha_A g_A(x),$$

and $$m(x)_{updated} = m(x) - \alpha_m g_m(x),$$

where $A_{(x)updated}$ is the updated source attributes model, $m(x)_{updated}$ is the updated material medium properties model, $\alpha_A$ and $\alpha_m$ are one-dimensional minimizers of said objective function along vectors $A(x)-\alpha_A g_A(x)$ and $m(x)-\alpha_m g_m(x)$, respectively, optionally replaced by the scaled Hessian or the scaled pseudo-Hessian, and (i) wherein the processor further optionally iterates steps (e)-(h) at least once more, by using said updated source attributes model and said updated material medium properties model of step (h) in step (e), thereby further updating said source attributes model and further updating said material medium properties model.

* * * * *